(12) United States Patent
Mohebbi

(10) Patent No.: US 6,768,907 B1
(45) Date of Patent: Jul. 27, 2004

(54) VELOCITY DEPENDENT SOFT HANDOVER FOR A CDMA CELLULAR SYSTEM WITH RANDOM BTS SELECTION

(75) Inventor: Behzad Mohebbi, San Diego, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/719,076

(22) PCT Filed: Apr. 28, 1999

(86) PCT No.: PCT/GB99/01346

§ 371 (c)(1),
(2), (4) Date: Feb. 9, 2001

(87) PCT Pub. No.: WO99/66756

PCT Pub. Date: Dec. 23, 1999

(30) Foreign Application Priority Data

Jun. 12, 1998 (GB) ............................................... 9812791

(51) Int. Cl.[7] .................................................. H04Q 7/20
(52) U.S. Cl. ....................... 455/439; 455/442; 455/438; 370/331
(58) Field of Search ................................. 455/436, 437, 455/438, 439, 441, 442, 445, 444; 370/331, 329, 332, 333, 335

(56) References Cited

U.S. PATENT DOCUMENTS 5,432,842 A * 7/1995 Kinoshita et al. ............ 455/440
6,212,381 B1 * 4/2001 Oda ............................ 455/441

FOREIGN PATENT DOCUMENTS

| EP | 0 796 022 A | 9/1997 | |
|----|----|----|----|
| EP | 0 797 367 A | 9/1997 | |
| EP | 0797367 A2 * | 9/1997 | ............ H04Q/7/22 |
| EP | 0 812 119 A | 12/1997 | |
| EP | 0 920 230 A | 6/1999 | |
| WO | WO 92 01950 A | 2/1992 | |

* cited by examiner

*Primary Examiner*—Edward F. Urban
*Assistant Examiner*—Blane J. Jackson
(74) *Attorney, Agent, or Firm*—Katten Muchin Zavis Rosenman

(57) ABSTRACT

A cellular mobile communications network includes a mobile station (40), a plurality of base transceiver stations (20), each for receiving uplink signals from the mobile station (40), and a base station controller (30) connected to the base transceiver stations (20) for receiving therefrom such uplink signals. During a hand-off operation involving more than one of the base transceiver stations (20) of the network, a subset of those base transceiver stations (20) involved in the hand-off operation is selected, the subset being those base transceiver stations (20) which are to forward a received uplink signal to the base station controller (30). At least one of the base transceiver stations (20) involved in the hand-off operation is operable, when that station is involved in such a hand-off operation, to determine, based on the subset of base transceiver stations, whether or not to forward to the base station controller (30) such an uplink signal received from the mobile station (40). Such a cellular mobile communications network can be effective in reducing the load on the fixed network (5) when the mobile station (40) is fast-moving.

10 Claims, 12 Drawing Sheets

VELOCITY DEPENDENT SOFT HANDOVER FOR A CDMA CELLULAR SYSTEM WITH RANDOM BTS SELECTION

BACKGROUND OF THE INVENTION

1. Field of the Invention

The present invention relates to cellular mobile communication networks, for example Code Division Multiple Access (CDMA) cellular networks.

2. Description of the Related Art

FIG. 1 of the accompanying drawings shows parts of a cellular mobile telecommunication network according to the Telecommunication Industries Association (TIA)/Electronic Industries Association (EIA) Standard TIA/EIA/IS-95 of October 1994 (hereinafter "IS95"). Each of three base transceiver stations (BTSs) 4 (BTS1, BTS2 and BTS3) is connected via a fixed network 5 to a base station controller (BSC) 6, which is in turn connected to a mobile switching centre (MSC) 7. The BSC 6 serves to manage the radio resources of its connected BTSs 4, for example by performing hand-off and allocating radio channels. The MSC 7 serves to provide switching functions and coordinates location registration and call delivery.

Each BTS 4 serves a cell 8. When a mobile station (MS) 10 is in a so-called "soft hand-off" (SHO) region 9 where two or more cells overlap, a mobile station can receive transmission signals (downlink signals) of comparable strength and quality from the respective BTSs of the overlapping cells. Transmission signals (uplink signals) produced by the mobile station (MS) can also be received at comparable strengths and qualities by these different BTSs when the mobile station is in the SHO region 9.

FIG. 2 of the accompanying drawings shows a situation where the MS 10 is located within the SHO region 9, and is transmitting such uplink signals that are being received by plural BTSs 4. According to the IS95 standard, a BTS 4 that receives such an uplink signal from the MS 10 relays the signal to the BSC 6 via a dedicated connection line of the fixed network 5. At the BSC 6, one of the relayed signals is selected based on a comparison of the quality of each of the received signals, and the selected signal is relayed to the MSC 7. This selection is referred to as Selection Diversity.

Similarly, FIG. 3 of the accompanying drawings shows a situation where the MS 10 is located within the SHO region 9 and is receiving downlink signals from plural BTSs 4. According to the IS95 standard, downlink signals received by the BSC 6 from the MSC 7 are relayed to all BTSs 4 involved in the soft hand-off via respective connection lines of the fixed network 5, and subsequently transmitted by all the BTSs 4 to the MS 10. At the MS 10 the multiple signals may be combined, for example, by using maximum ratio combination (MRC), or one of them may be selected based on the signal strength or quality, i.e. using Selection Diversity as for the uplink case.

In contrast to, for example, Global System for Mobile Communication (GSM) networks, in CDMA networks each BTS 4 transmits at the same frequency. Consequently, careful control of transmission power must be maintained to minimise interference problems.

Signals are transmitted as a succession of frames according to the IS95 standard. As FIG. 4 of the accompanying drawings shows, each frame is of duration 20 ms, and comprises sixteen 1.25 ms time slots. In each time slot several bits of user data and/or control information can be transmitted.

Power control of transmissions from the MS 10 to the BTSs 4 (uplink power control) in IS95 is achieved as follows. When a BTS 4 receives a signal from the MS 10 it determines whether a predetermined property of the received signal (for example absolute signal level, signal to noise ratio (SNR), signal-to-interference ratio (SIR), bit error rate (BER) or frame error rate (FER)) exceeds a preselected threshold level. Based on this determination, the BTS 4 instructs the MS 10 either to reduce or to increase its transmission power in the next time slot.

For this purpose, two bits in every time slot of a pilot channel (PCH) from the BTS 4 to the MS 10 are allocated for uplink power control (see FIG. 4). Both bits have the same value, and accordingly will be referred to hereinafter as the "power control bit" (or PCB) in the singular. The power control bit is assigned a value of zero by the BTS 4 if the MS 10 is required to increase transmission power by 1 dB, and a value of one if the MS 10 is required to decrease transmission power by 1 dB. The BTS 4 is not able to request directly that the MS 10 maintain the same transmission power; only by alternately transmitting ones and zeros in the power control bit is the transmission power maintained at the same level.

When the MS 10 is in a SHO region 9, the MS 10 is required to make a decision on whether to increase or to decrease uplink transmission power based on a plurality of power control bits received respectively from the BTSs 4 involved in the soft hand-off. Consequently, an OR function is performed on all the power control bits. If the result of this OR function is zero then the MS 10 will increase power on uplink transmissions, and if the result is one then the MS 10 will decrease power on uplink transmissions. In this way, uplink transmission power is only increased if all BTSs 4 ask for an increase.

Power control of transmissions from the BTS 4 to the MS 10 (downlink power control) in IS95 is achieved as follows. When the MS 10 receives a downlink signal from a BTS 4 (or from each of a plurality of BTSs 4 in soft hand-off operation) via a traffic channel (TCH), the FER of that signal is calculated by the MS 10 which reflects the degree to which the traffic-channel signal has been corrupted by, for example, noise. This FER is then relayed by the MS 10 to the BTS 4 which transmitted the downlink signal concerned, and the BTS 4 uses this FER to decide whether to make any change to its downlink transmission power.

The soft hand-off system described above is effective in improving signal transmission between the MS 10 and the network when the MS 10 is located in regions of cell overlap near the boundaries of the individual cells. Signal quality in these regions when using a single BTS 4 may be relatively poor, but by making use of more than one BTS 4 the quality may be substantially improved.

However, the IS95 soft hand-off system has the disadvantage of increasing signal traffic ("backhaul") in the fixed network 5 since it is necessary to transmit signals carrying the same data and/or control information between the BSC 6 and every BTS 4 involved in the soft hand-off for both the uplink and downlink cases described above. This duplication of information is undesirable for two main reasons. Firstly, it leads to more traffic congestion in the fixed network. Secondly, higher costs are experienced by the mobile service provider (and consequently the mobile service user), who may not own the fixed network infrastructure.

This disadvantage is addressed in our co-pending UK patent application No. 9810424.3, in which a soft hand-off method is provided where it may be determined, in certain circumstances, that it is not necessary to transmit the same data between the BSC 6 and every BTS 4. For the uplink case, for example, a BTS 4 may decide that it does not need to transmit an uplink signal received from the MS 10 to the BSC 6 if it may be ascertained that another BTS 4 involved in the soft hand-off operation is receiving the same signal more strongly. For the purpose of making this decision, in each time slot (or frame), each BTS 4 receives from the MS 10 a power control message containing all of the uplink power control bits last sent to the MS 10 by the BTSs involved in the soft hand-off operation.

Therefore the decision of whether or not to transmit the uplink signal from the BTS 4 to the BSC 6 is made based on uplink signal quality in the previous, not the current, time slot (or frame). This is sufficient for a relatively slow-moving mobile station where the fading characteristics of the air interface between MS 10 and BTS 4 change slowly so that the received signal power at the BTS 4 in one time slot (or frame) is closely related to that of the previous time slot, as illustrated in FIG. 5A of the accompanying drawings. However, for a fast-moving mobile, say one travelling faster than 100 km/h in a non-perpendicular direction, it has now been appreciated that the received power at the BTS 4 in each time slot may be uncorrelated with that of the previous time slot, as illustrated in FIG. 5B of the accompanying drawings. In this case it may not be appropriate to base the uplink signal transmission decision for the current time slot on received signal measures from the previous time slot.

SUMMARY OF THE INVENTION

According to a first aspect of the present invention there is provided a cellular mobile communications network including: a mobile station; a plurality of base transceiver stations, each for receiving uplink signals from the mobile station; and base station controller means connected to the said base transceiver stations for receiving therefrom such uplink signals; wherein the network further includes base transceiver station selection means operable, during a hand-off operation involving more than one of the said base transceiver stations of the network, to select a subset of those base transceiver stations involved in the hand-off operation, the said subset being those base transceiver stations which are to forward a received uplink signal to the base station controller means; and at least one of the said base transceiver stations involved in the hand-off operation includes hand-off control means operable, when that station is involved in such a hand-off operation, to determine, based on the said subset of base transceiver stations, whether or not to forward to the said base station controller means such an uplink signal received from the mobile station.

According to a second aspect of the present invention there is provided a mobile station, for use in a cellular mobile communications network, including: transmitter means for transmitting uplink signals to a base transceiver station of the network; base transceiver station selection means operable, during a hand-off operation involving more than one of the said base transceiver stations of the network, to select a subset of such base transceiver stations, said subset indicating those base transceiver stations which are to forward an uplink signal to base station controller means of the network when such a signal is received from the mobile station; and hand-off control means connected to the said transmitter means and operable, during such a hand-off operation, to cause the said transmitter means to include, in one or more of the said uplink signals, a subset message indicative of the said subset of base transceiver stations.

According to a third aspect of the present invention there is provided a base transceiver station, for use in a cellular mobile communications network, including: receiver means for receiving uplink signals from a mobile station of the network; and hand-off control means operable, when the claimed base transceiver station is involved in a hand-off operation, to determine, based on a subset of base transceiver stations selected by base transceiver selection means of the network, whether or not to forward to base station controller means of the network such an uplink signal received from the mobile station, said subset indicating those base transceiver stations which are to forward the received uplink signal to base station controller means.

According to a fourth aspect of the present invention there is provided a hand-off control method for use in a cellular mobile communications network, wherein: when a hand-off operation involving more than one base transceiver station of the network is being performed, a base transceiver station selection means of the network selects a subset of those base transceiver stations, the said subset indicating those base transceiver stations that are to forward uplink signals received from a mobile station of the network to a base station controller of the network; and in the said plurality of base transceiver stations, the subset is examined and a determination is made whether or not to forward to the base station controller of the network an uplink signal received from the mobile station.

According to a fifth aspect of the present invention there is provided a cellular mobile communications network including: a mobile station; a plurality of base transceiver stations, each for transmitting downlink signals to the said mobile station; and base station controller means connected to the said base transceiver stations for applying thereto such downlink signals; wherein the said base station controller means further include: base transceiver station selection means operable, during a hand-off operation involving more than one of the said base transceiver stations of the network, to select a subset of those base transceiver stations involved in the hand-off operation, the said subset being those base transceiver stations which are to transmit the said downlink signal to the mobile station; and hand-off control means operable, during such a hand-off operation, to supply the downlink signal only to the said subset of base transceiver stations.

According to a sixth aspect of the present invention there is provided a base station controller, for use in a cellular mobile telecommunications network, to apply downlink signals to a plurality of base transceiver stations of the network, including: base transceiver station selection means operable, during a hand-off operation involving more than one of said plurality of base transceiver stations of the network, to select a subset of such base transceiver stations, said subset indicating those base transceiver stations which are to transmit the said downlink signals to a mobile station of the network when such a signal is received from the base station controller; and hand-off control means operable, during such a hand-off operation, to apply said downlink signals only to those base transceiver stations included in the said subset of base transceiver stations.

According to a seventh aspect of the present invention there is provided a hand-off control method for use in a cellular mobile communications network, wherein: when a hand-off operation involving more than one base transceiver station of the network is being performed, a base station controller means of the network determines to apply downlink signals only to a subset of such base transceiver stations involved in the hand-off operation, such subset being selected by base transceiver station selection means of the network.

DETAILED DESCRIPTION OF THE PREFERRED EMBODIMENTS

Figure 6:
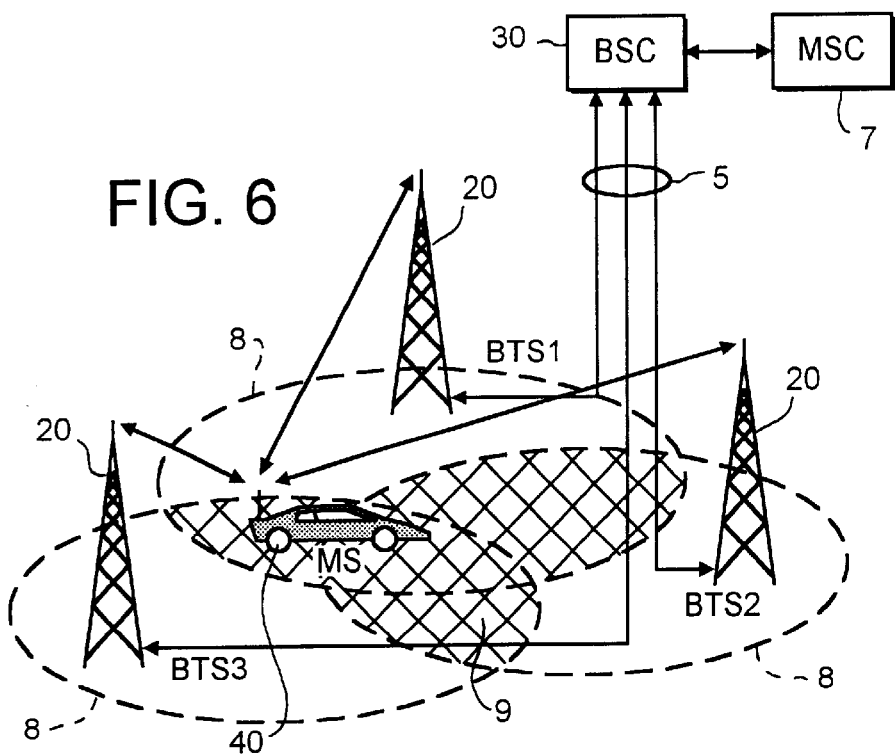
FIG. 6 shows parts of a mobile telecommunication network embodying the present invention.

FIG. 6 shows parts of a mobile telecommunication network embodying the present invention. In FIG. 6, elements that are the same as elements of the FIG. 1 network described previously have the same reference numerals and an explanation thereof is omitted.

The FIG. 6 network is a wideband CDMA (W-CDMA) network for a proposed new standard for mobile telecommunications, referred to as a universal mobile telecommunications system (UMTS) or UMTS terrestrial radio access (UTRA). This is generally similar to the IS95-standard network described previously, although certain implementation details are yet to be finalised. Details that are different from IS95 include the frame duration, which is 10 ms, and the time-slot duration which is 625 $\mu$s. The overall bit rate is within the range from 8 kbits/s to 2 Mbits/s. Also downlink power control in W-CDMA is closed-loop and is based on the same principles as the uplink power control.

The preferred embodiment will be described in relation to a wideband CDMA network operating in a soft hand-off mode, but other embodiments are not restricted to operation in the soft hand-off mode or even in such a network. For example the present invention may be applied to a Global System for Mobile Communication (GSM) network in the case where a mobile station is within communication range of more than one BTS.

In FIG. 6, each of three base transceiver stations (BTSs) 20 (BTS1, BTS2 and BTS3) is connected via a fixed network 5 to a base station controller (BSC) 30, which is in turn connected to a mobile switching centre (MSC) 7. Each BTS 20 serves a cell 8. A mobile station (MS) 40 is in a soft hand-off (SHO) region 9 and can receive downlink signals from, and transmit uplink signals to, all the BTSs 20 involved in the soft hand-off.

Figure 1:
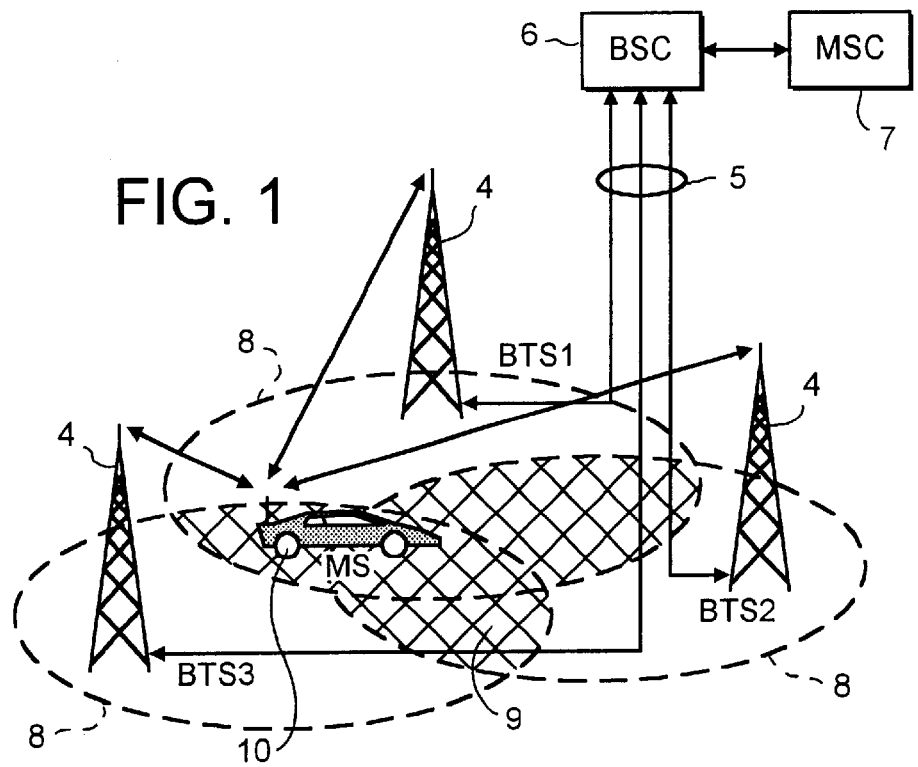
FIG. 1, discussed hereinbefore, shows parts of a cellular mobile telecommunication network according to IS95.
Figure 2:
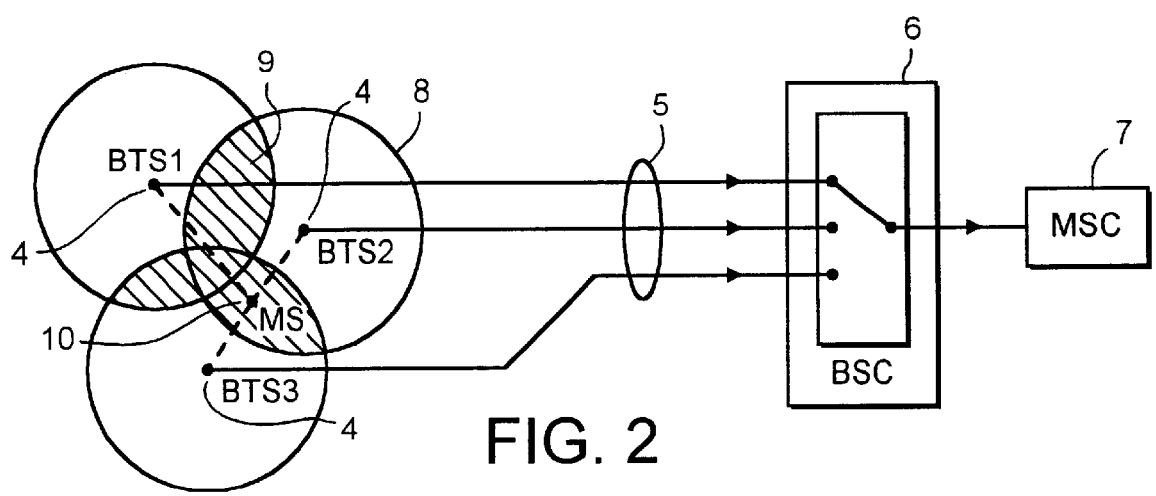
FIG. 2, also discussed hereinbefore, shows a schematic view for use in explaining processing of uplink signals in a soft hand-off operation performed by the FIG. 1 network.
Figure 3:
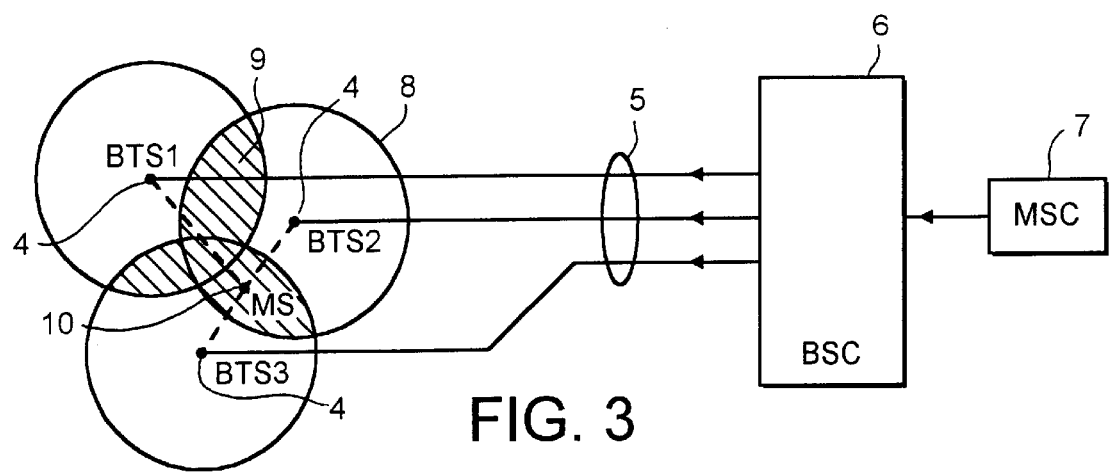
FIG. 3, also discussed hereinbefore, shows a schematic view for use in explaining processing of downlink signals in such a soft hand-of operation.
Figure 4:
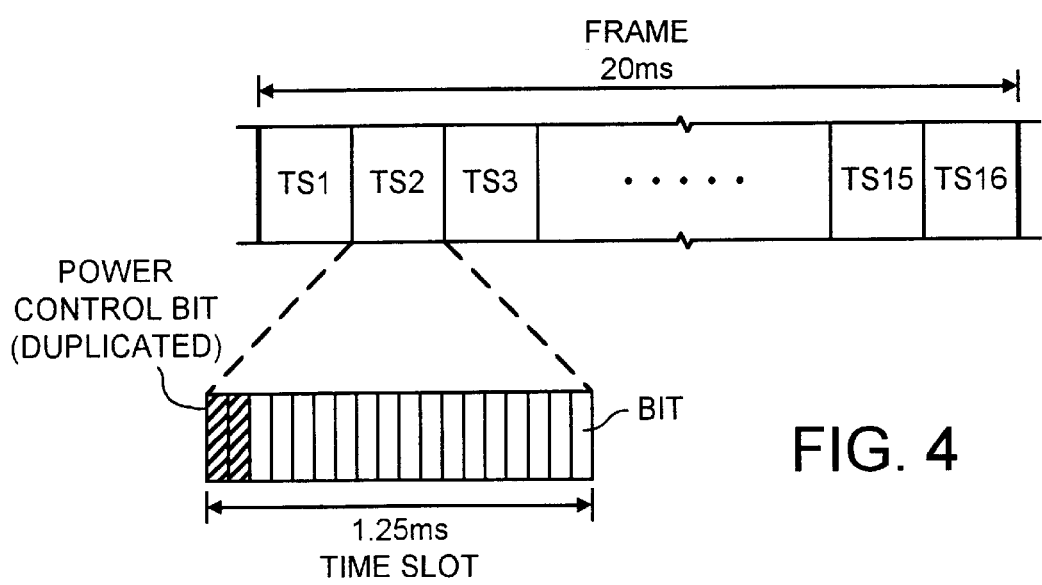
FIG. 4, also discussed hereinbefore, illustrates the format of a time frame in the FIG. 1 network.

The FIG. 6 network corresponds generally with the FIG. 1 network, but the MS 40, BTSs 20 and BSC 30 are constructed and operate differently from the corresponding elements in FIG. 1, as will be described later.

Embodiments of the present invention are intended to come into operation when it is detected that the speed of the mobile station 40 goes above a predetermined limit ("high speed"). As described previously, when the mobile station 40 is travelling at speeds below this limit ("low speed"), operations performed by the network may be as set out in our co-pending UK application No. 9810424.3.

Figure 5A:
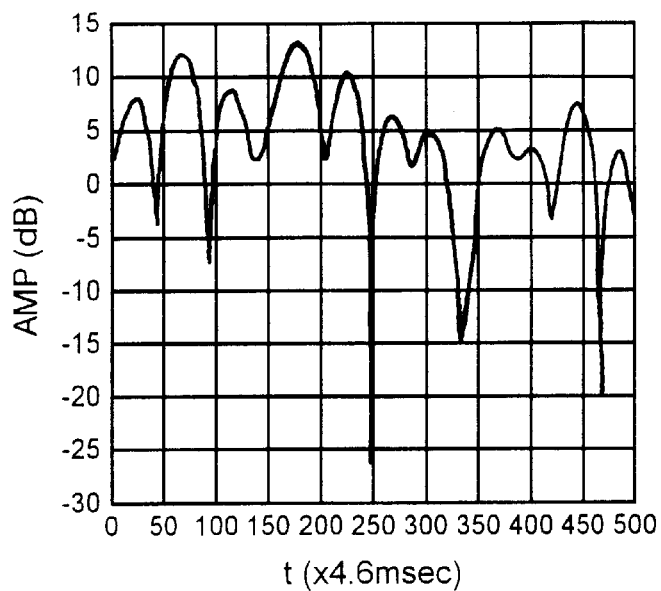
FIG. 5A shows an example of a received signal power at a base station transceiver from a slow-moving mobile station.

An example of how such a determination of mobile speed may be made will now be described, with reference to FIGS. 5A, 5B and.7. The example is described for one BTS 20 which is in communication with an MS 40; the BTS 20 is receiving uplink signals (US) from the MS 40 and transmitting downlink signals (DS) to the MS 40. FIG. 5A shows an example of the received uplink signal power at the BTS 20 for a low speed mobile transmitting at a constant power. Variations in received power may be caused by variations in the fading characteristics of the path between MS 40 and BTS 20 as the MS 40 moves; the path may also become obscured by buildings or high terrain.

As described previously, the BTS 20 attempts to maintain the received power at a constant level by instructing the MS 40 either to increase or decrease, in the next time slot, its transmission power using a power control bit in each time slot. For a slow-moving mobile, associated with slowly-varying fading characteristics, the BTS 20 is able to control the power of the MS 40 to maintain received power at the required level.

Figure 5B:
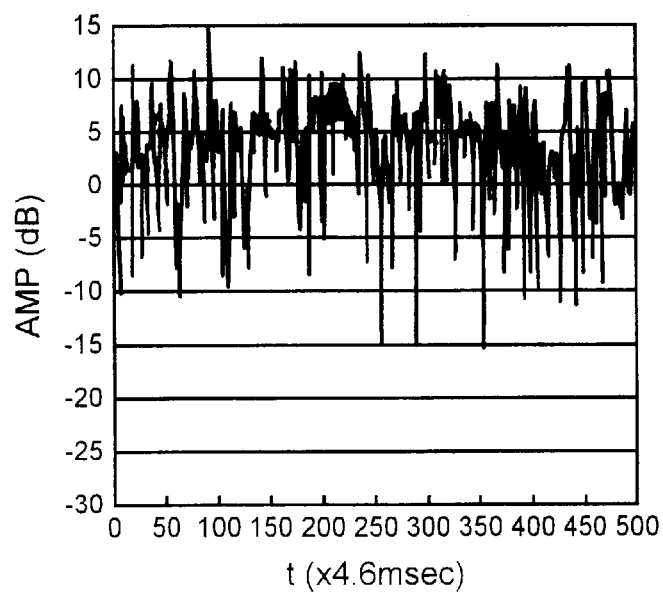
FIG. 5B shows an example of a received signal power at a base station transceiver from a fast-moving mobile station.

However, when the MS 40 is fast-moving, the received power may vary too fast (as shown in FIG. 5B) for the BTS 20 to control using one power control bit per time slot; in this case the received power for each time slot may become uncorrelated with that of the previous time slot.

Figure 7:
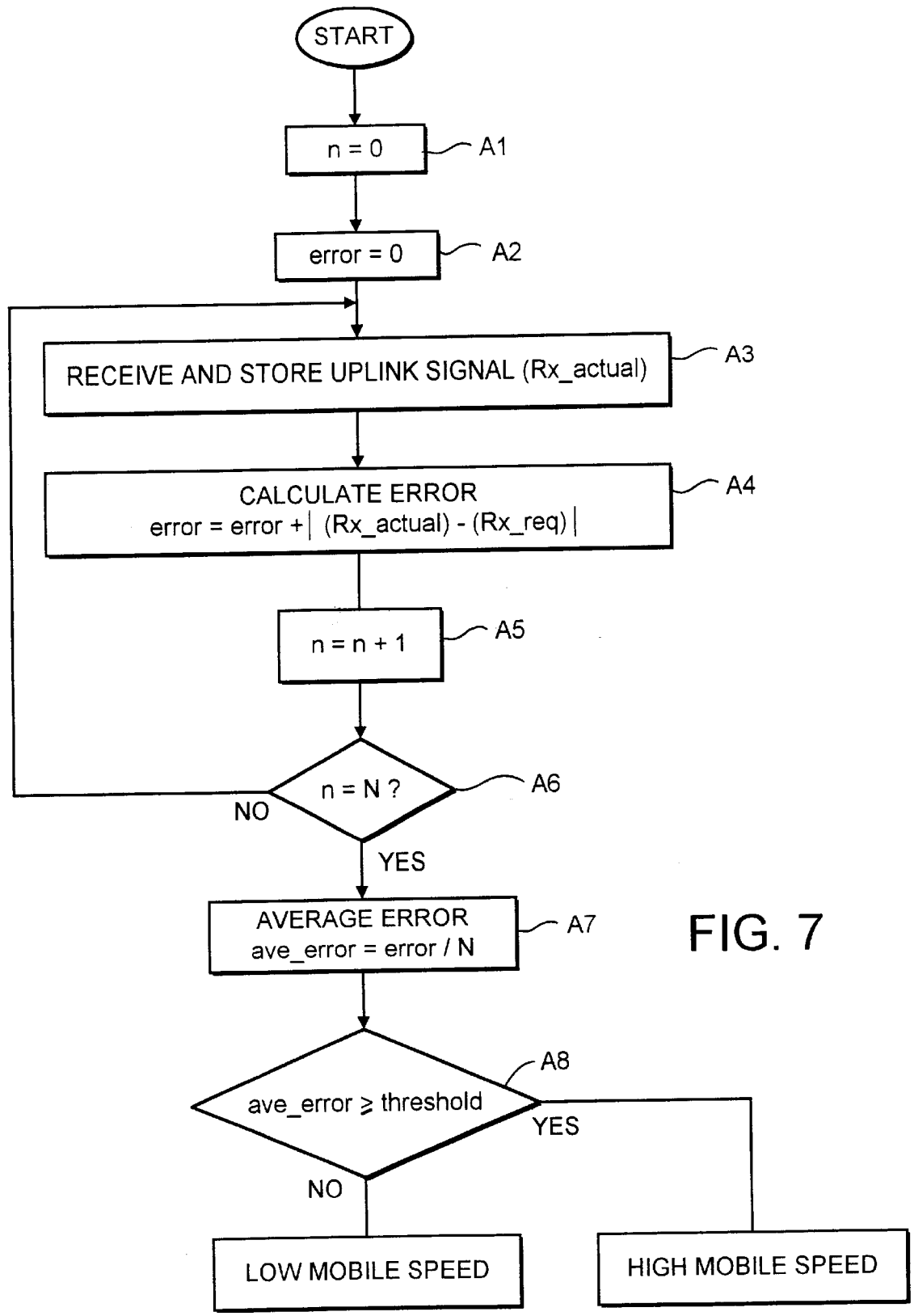
FIG. 7 is a flowchart for explaining one way of detecting whether a mobile station is fast-moving.

This is the basis for an example algorithm, shown in FIG. 7, for determining whether an MS 40 is slow-or fast-moving.

In steps A1 and A2, a counter "n" and a value "error" respectively are set to zero. In step A3, the BTS 20 receives an uplink signal from the MS 40 and stores the absolute power (Rx_actual) of this signal. In step A4, the "error" measure is incremented based on the absolute difference between the received and required power levels. The required power level is the previously-received power level plus or minus 1 dB (depending on whether the BTS 20 instructed the MS 40 to increase or decrease its transmission power in the previous time slot). Therefore this "error" measure will become large quickly when the received signal power is changing too fast for the BTS 20 to control.

In step A5 the counter "n" is incremented, and compared with a preselected value "N" in step A6. "N" may be chosen such that the MS 40 is allowed to travel through a distance of approximately 40$\lambda$ before "n" reaches "N", where $\lambda$ is the wavelength of transmissions from the MS 40. For an MS 40 travelling at 100 km/h and transmitting at 2 GHz with time slots of duration 625 µs, "N" is approximately 350.

When it is determined in step A6 that "n" has reached "N", processing continues to step A7; otherwise processing is returned to step A3. In step A7 the average error "ave_error" is calculated from the "error" measure, and this is compared with a predetermined threshold value "threshold" in step A8.

If it is determined in step A8 that "ave_error" is greater than or equal to "threshold", then this indicates that the mobile is fast-moving, and a fast mobile message (FMM) indicating a fast mobile is communicated to the network elements. On the other hand, if "ave_error" is less than "threshold", a slow mobile message (SMM) indicating a slow mobile may be communicated to the network elements.

This example has been described for an MS 40 in communication with one BTS 20. In a soft hand-off operation, of course, the mobile is actually communicating with more than one BTS 20, and therefore a more sophisticated algorithm (using the same principle as above) must be used, but will not be described here.

In the present description of the preferred embodiments of the present invention, it will be assumed that it has already been detected by the network that the MS 40 is travelling at high speed, i.e. above the predetermined limit, and that operations should be carried out by the network according to the present invention in a manner referred to hereinafter as BTS hopping mode.

Figure 8:
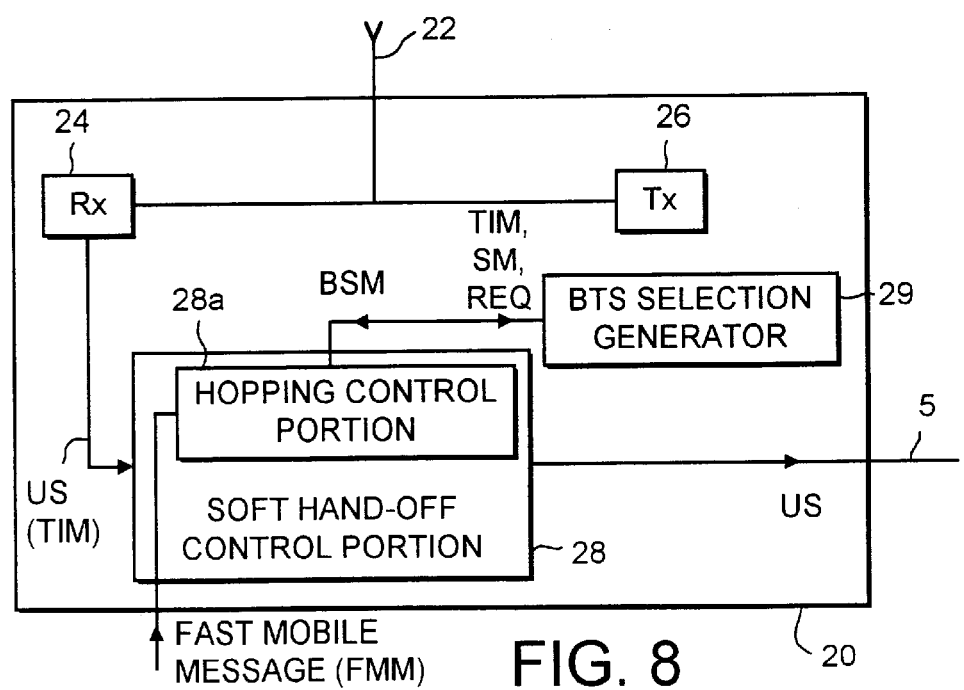
FIG. 8 shows parts of a base transceiver station embodying the present invention.

FIG. 8 is a block diagram showing parts of a BTS 20 embodying the present invention. An antenna element 22 is connected (e.g. via a duplexer—not shown) to a receiver portion 24 and a transmitter portion 26. A soft hand-off control portion 28 receives an uplink signal US from the receiver portion 24, and in turn applies the received US (or a signal derived therefrom) to the fixed network 5 for transmission to the BSC 30. The soft hand-off control portion 28 has a hopping control portion 28a operative in response to the previously-described fast mobile message (FMM) from the network. The hopping control portion 28a is connected to a BTS selection generator (BSG) 29.

The hopping control portion 28a is used to control transmission of the uplink signal US to the BSC 30 during soft hand-off when the BTS 20 is operating in BTS hopping mode. In this mode, one of the BTSs involved in the soft hand-off is selected to transmit each received uplink signal to the BSC 30. This selection is made by the BTS selection generator (BSG) 29 within each BTS 20. Each BSG 29 is initialised and operates in the same way, so that the same BTS 20 is selected by each BSG 29 for each uplink signal.

Figure 9:
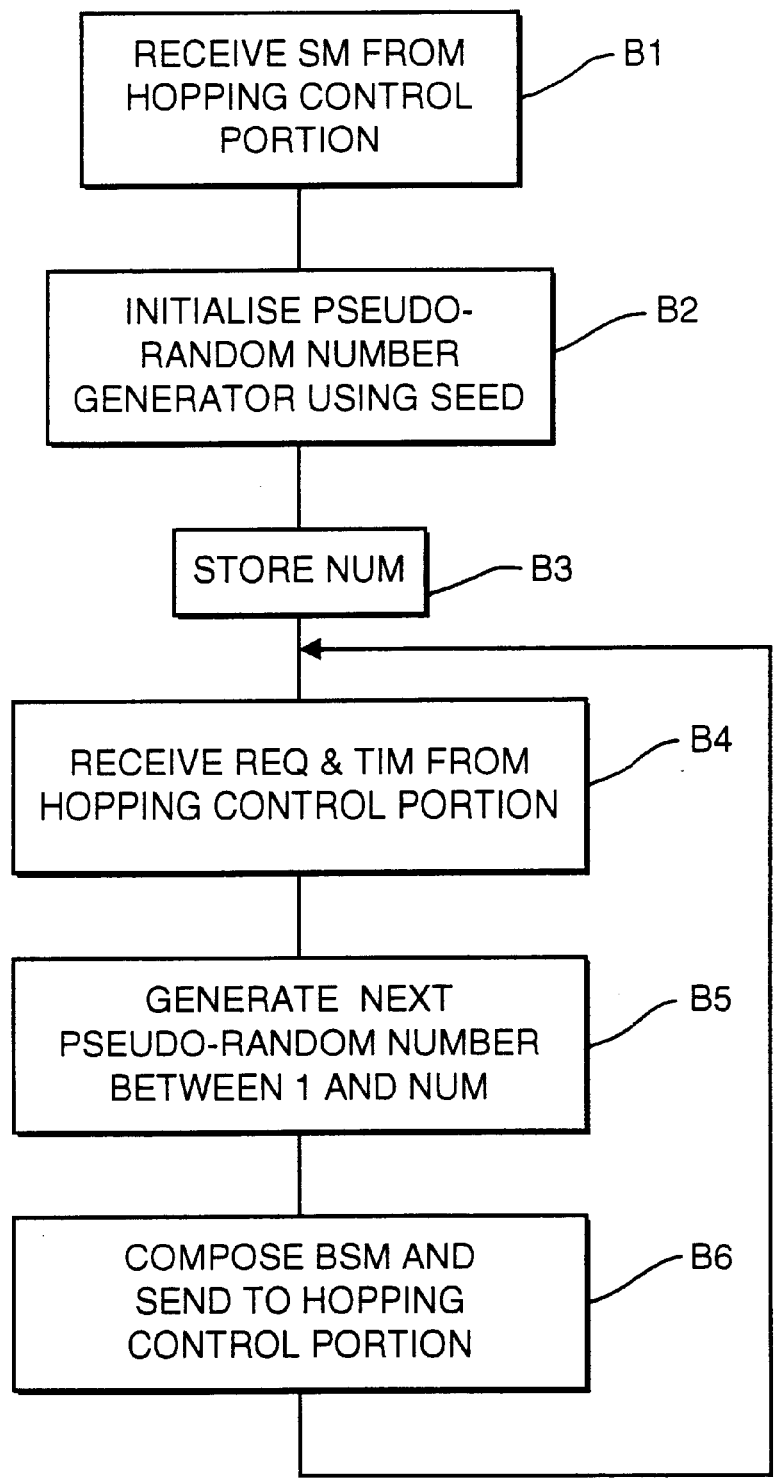
FIG. 9 is a flowchart for illustrating the actions taken by a component of the FIG. 8 base transceiver station.

An example of the operation of a BSG 29 will now be described with reference to the flow chart in FIG. 9. In step B1, a seed message (SM) is received by the BSG 29 which contains information which enables the BSG 29 to set its starting configuration in a way that allows it to generate a controlled sequence of BTS selections. Any BSG 29 which receives the same SM will generate the same sequence of BTS selections. In this example, the BSG 29 is generating a pseudo-random sequence of numbers using a pseudo-random number generator which is initialised using a SEED value in step B2. Although the numbers of such a pseudo-random sequence are random in nature, the sequence is exactly specified by a single SEED number, which is communicated to the BSG 29 within the SM in step B1. Also contained within the SM is a value NUM which indicates the number of BTSs involved in the soft hand-off. This NUM value is stored in step B3.

Operation of the BSG 29 then enters a loop from step B4 to step B6 where the BSG 29 is repeatedly requested to generate a new BTS selection. In step B4, such a request is received via a REQ signal from the hopping control portion 28a. Also received in step B4 is a value TIM, which is the current time slot and/or frame number, which may be used to control timing within the pseudo-random number generator. In step B5, the next pseudo-random number between 1 and NUM is generated, and in step B6 a BTS selection message (BSM) is composed and sent to the hopping control portion 28a informing it of the selection made. This pseudo-random algorithm is similar to that used in the frequency hopping operation performed in GSM networks (GSM 05.02).

Detailed operation of the hopping control portion 28a of the BTS 20 will now be described with reference to the process illustrated in the flow-chart of FIG. 10. The process is initiated in step C1 when a fast mobile message (FMM) is received by the hopping control portion 28a, indicating that BTS hopping mode should be used. Every BTS 20 involved in the soft hand-off receives the FMM concurrently so that all switch to BTS hopping mode at the same time.

In step C2 the above-mentioned seed message (SM) is sent to the BTS selection generator (BSG) 29 in order to set the starting conditions of the BSG 29. The same seed message (SM) is sent to each BSG 29 in all BTSs 20 involved in the soft hand-off. The SM may therefore be included in the FMM which is communicated to each such BTS 20. The process then continues into the BTS hopping mode loop starting in step C3.

In step C3 an uplink signal US is received by the hopping control portion 28a from the MS 40 (via the antenna element 22 and receiver portion 24). The hopping control portion 28a must now decide whether or not it is to transmit this US (or a signal derived therefrom) to the BSC 30. To this end, a REQ signal is sent to the BSG 29 in step C4 to request a BTS selection message (BSM), which is received in step C5. In step C4 a value TIM is also sent to the BSG 29 to control and coordinate the timing of each BSG 29 in each BTS 20. The value TIM may, for example, be included in the US received in step C3.

On the basis of the received BSM, in step C6 the hopping control portion 28a decides whether or not the BTS 20 concerned is to transmit the US to the BSC 30. If it is decided that the BTS 20 is to transmit the US to the BSC 30, this is carried out in step C7, and processing is returned to step C3. If it decided not to transmit the US to the BSC 30, then processing is returned directly to step C3 from step C6.

Figure 10:
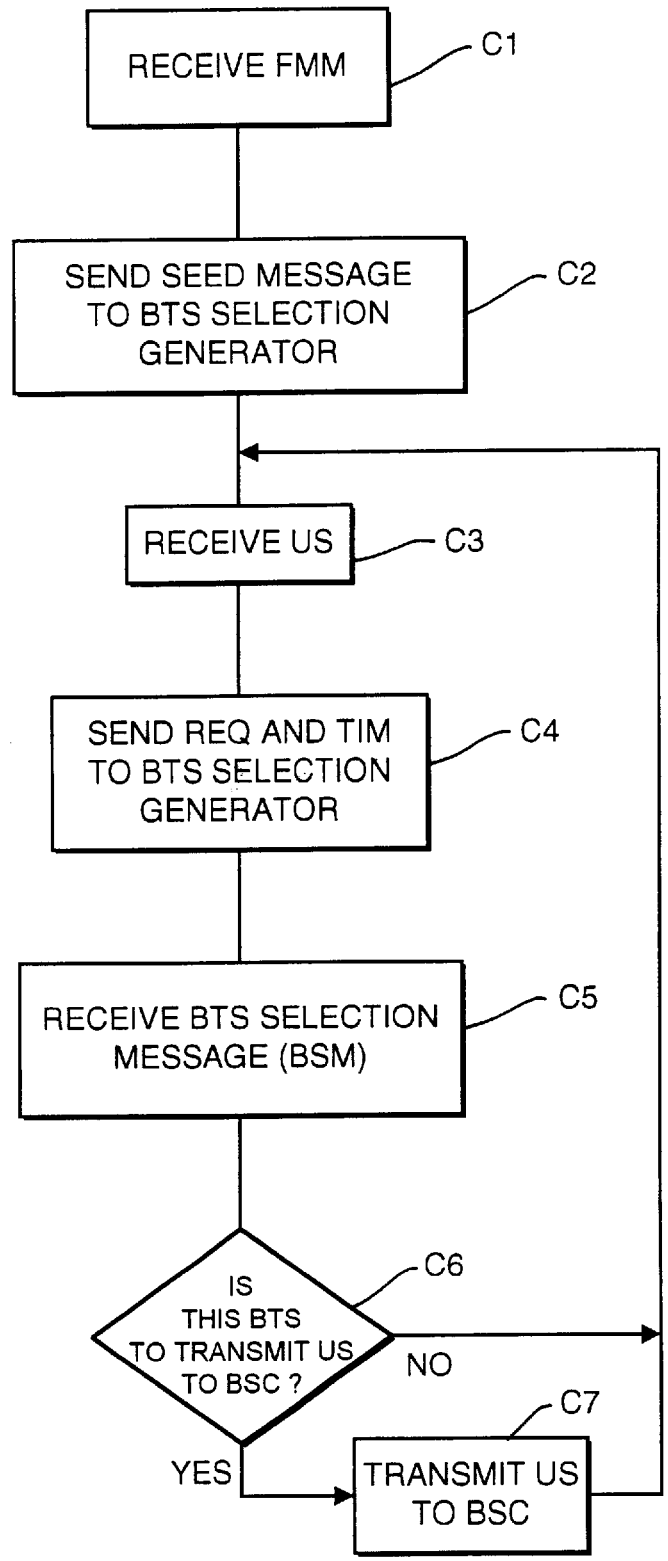
FIG. 10 is a flowchart for illustrating uplink processing in the FIG. 8 base transceiver station.

Since the BSG 29 receives the time slot and/or frame number for every pseudo-random number generated, each BSG 29 remains in step with the BSGs 29 of the other BTSs 20, even if, owing to (for example) a deep fade between the MS 40 and a particular BTS 20, that BTS 20 does not receive a US in step C3 of FIG. 10 (and consequently does not request a new selection in step C4) for one or more time slots.

When the BTSs 20 involved in the soft hand-off are operating in BTS hopping mode (i.e. when a fast mobile is detected) as described above, the result is that each time slot of the uplink signals emitted by the MS 40 is forwarded to the BSC 30 by only one BTS 20, that one BTS 20 having been selected at random for each time slot. In this way, uplink backhaul in the fixed network 5 is reduced.

It will be appreciated that a reduction in uplink fixed network backhaul may be achieved by selecting, rather than just one BTS 20 as described above, any number of BTSs (less than the total number involved in the soft hand-off) to transmit the US. Therefore the BTS selection message (BSM) could indicate more than one BTS 20 which is to transmit the US, or could even indicate one BTS 20 which is not to transmit the US.

It will also be appreciated that, rather than selecting BTSs 20 on a random basis, some other method could be used. For example, the BSG could cycle through a list of BTSs in order.

In addition, the BTS hopping operations need not be performed for every time slot. It would also be possible to work on a frame-by-frame basis, or even at time intervals other than frames or slots, for example based on a time interval consistent with the speed of the MS 40.

The above examples have been described with the BTS hopping operations being controlled from each BTS 20 involved in the soft hand-off. It is also possible alternatively for the MS 40 to control the BTS hopping operations, by itself selecting which BTS 20 should transmit the US to the BSC 30.

In this case, the BSG 29 would reside not in each BTS 20, but in the MS 40, and the MS 40 would also include a hopping control portion (a hopping control portion 28a would still remain in each BTS 20 but would perform different operations).

Figure 11:
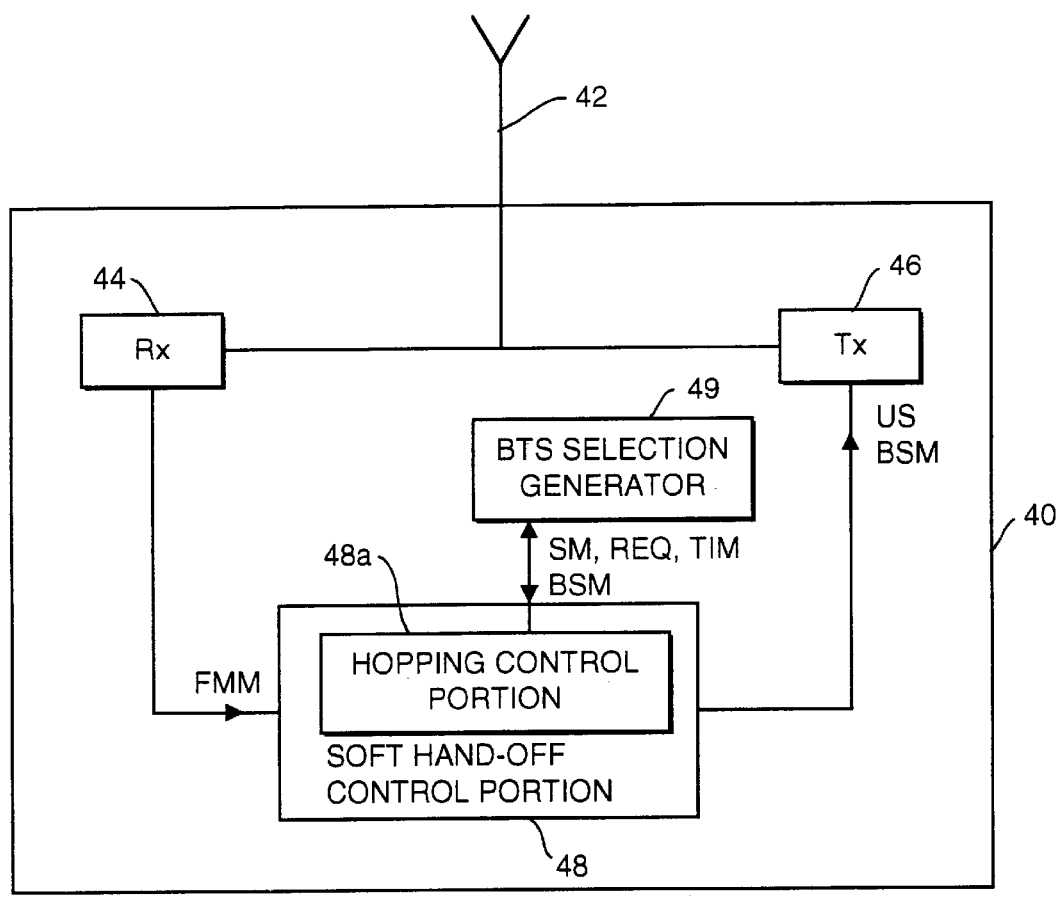
FIG. 11 shows parts of a mobile station embodying to the present invention.

An example of such an MS 40 is shown in FIG. 11. An antenna element 42 is connected (e.g. via a duplexer—not shown) to a receiver portion 44 and a transmitter portion 46. A soft hand-off control portion 48 receives signals from the receiver portion 44 and applies signals to the transmitter portion 46. The soft hand-off control portion 48 includes a hopping control portion 48a connected to a BTS selection generator (BSG) 49.

In this case, operations shown in the flow chart of FIG. 10 are now carried out partly by the hopping control portion 48a located within the MS 40, and partly by the hopping control portion 28a located within each BTS 20. The BSG 49 carries out the same operations as the BSG 29 which are shown in FIG. 9.

Figure 12:
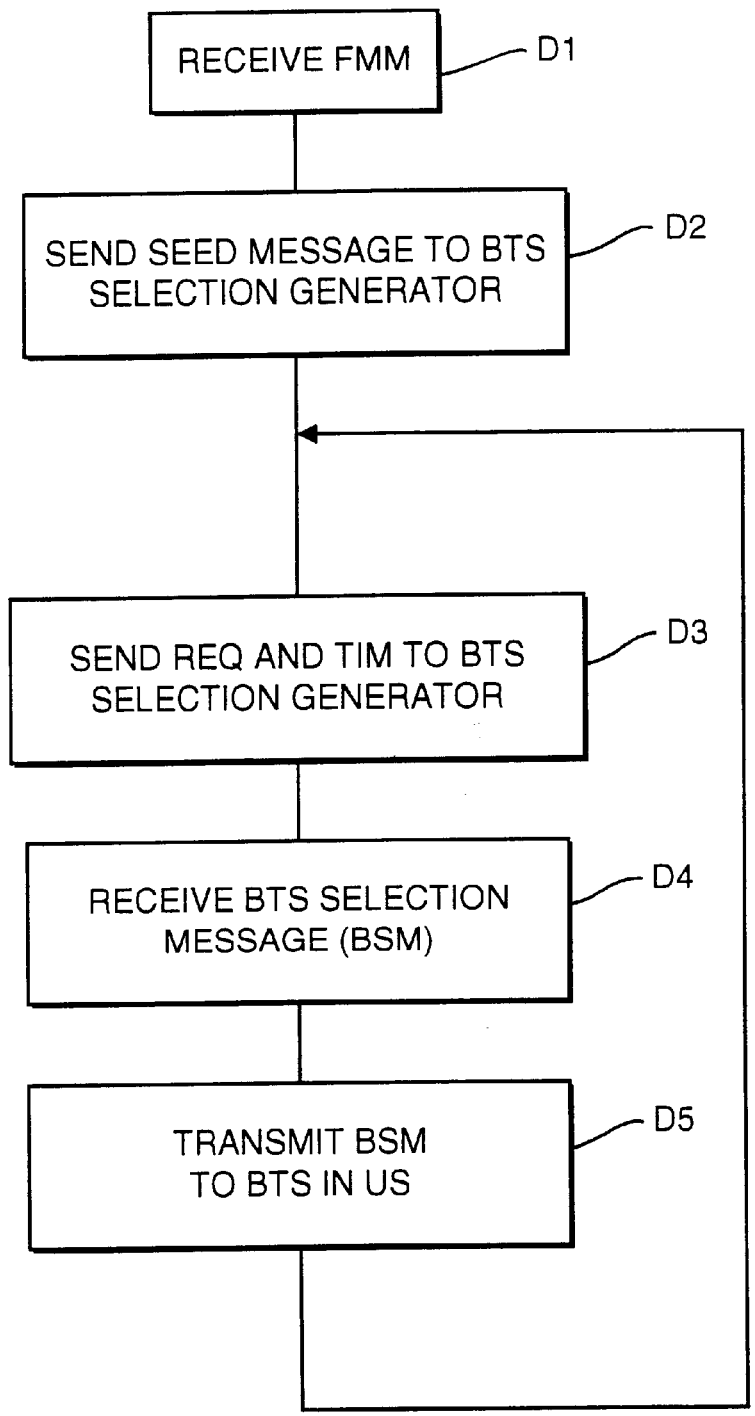
FIG. 12 is a flowchart for explaining the actions taken by the FIG. 11 mobile station.

FIG. 12 is a flow chart for explaining the operation of the hopping control portion 48a. Steps D1, D2, D3 and D4 are similar to steps C1, C2, C4 and C5 respectively of FIG. 10; however in step D1 the FMM is received via the receiver portion 44. In step D6, the BSM is included in the uplink signal and transmitted to the BTSs 20.

Figure 13:
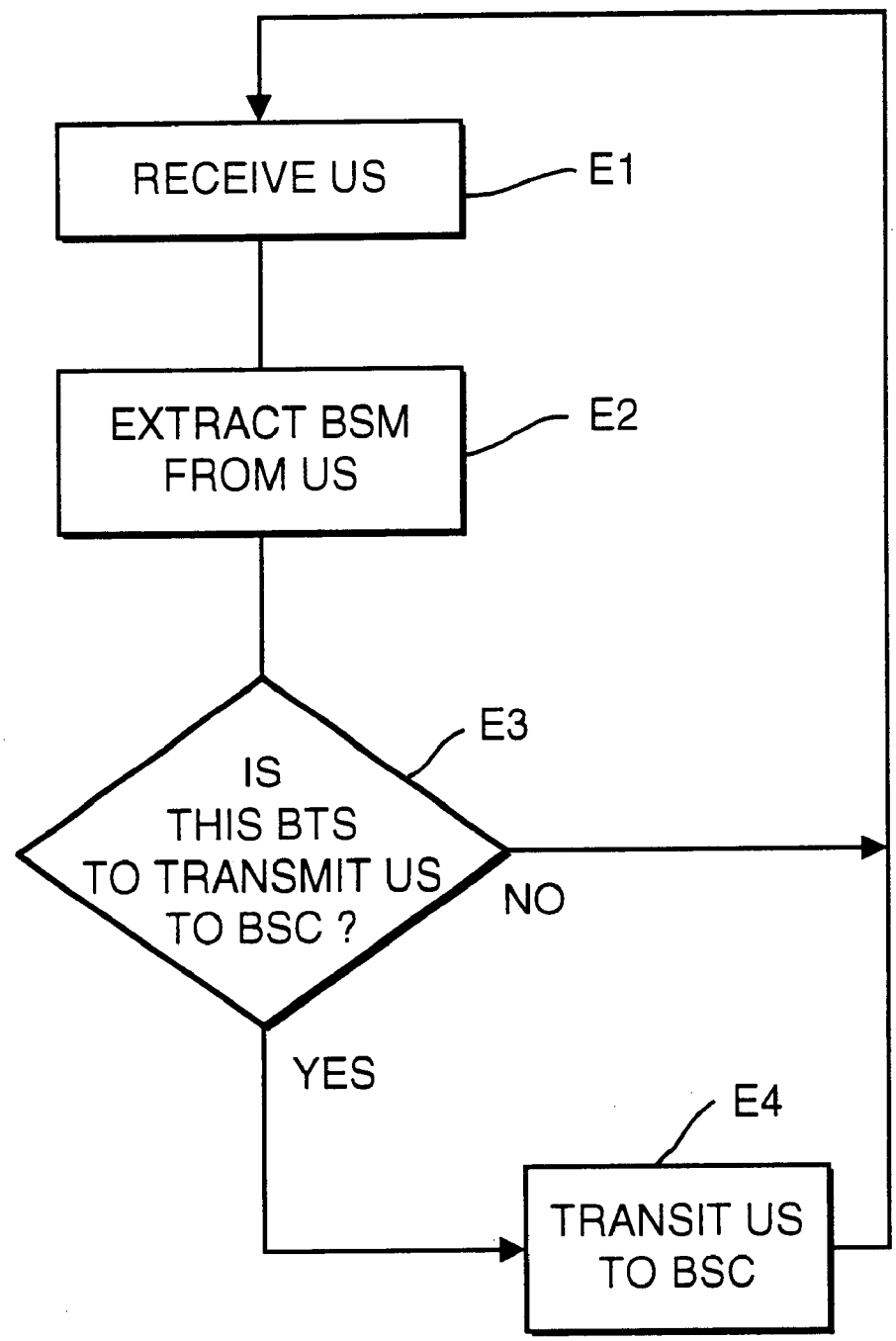
FIG. 13 is a flowchart for explaining the actions taken by a base transceiver station when the mobile station is acting according to FIG. 12.

FIG. 13 is a flow chart for explaining the processes of the hopping control portion 28a within the BTS 20 when a US is received in step E1. In step E2, the BSM is extracted from the US. In step E3, the BTS 20 uses the BSM to decide whether or not it is to transmit the received US to the BSC 30. If the decision is YES at step E3, the US is transmitted to the BSC 30 and processing returns to step E1. If the decision is NO at step E3, processing returns directly to step E1.

In this example, therefore, the MS 40 is responsible for deciding which BTS 20 is to transmit the US to the BSC 30, and communicates this decision to each BTS 20 by transmitting the BSM to each BTS 20. The BTS 20 is simply responsible for using this BSM to decide whether or not to transmit the US to the BSC 30.

Figure 14:
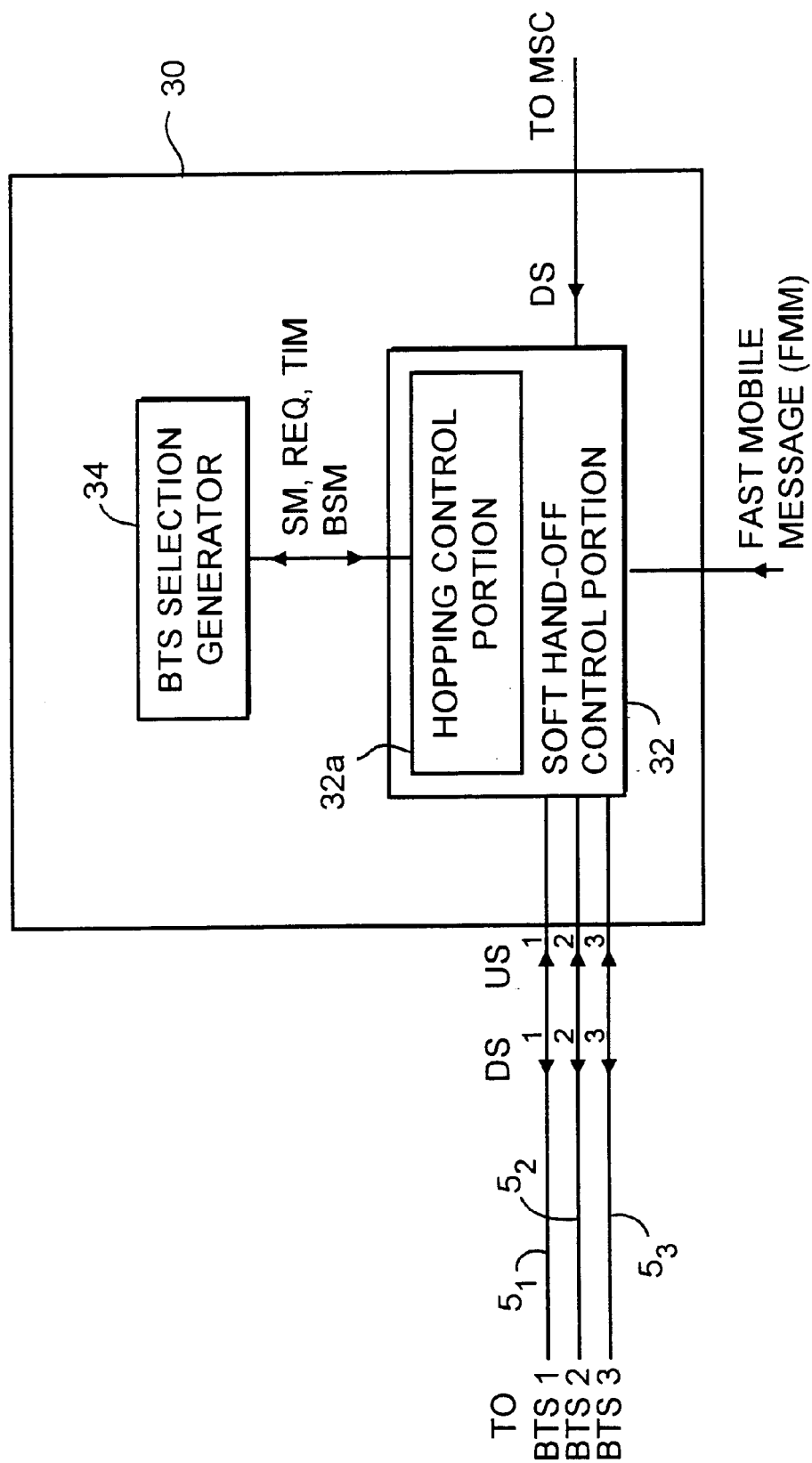
FIG. 14 shows parts of a base station controller embodying the present invention.

FIG. 14 shows parts of a BSC 30 adapted to perform hopping control operations for downlink signals. The BSC 30 includes a soft hand-off control portion 32, having a hopping control portion 32a, and a BTS selection generator 34.

In this example, it is assumed that the connection lines $5_1$ to $5_3$ linking each BTS to the BSC 30 are duplex lines which carry respective uplink and downlink signals US and DS between the BTS concerned and the BSC. For example, a first connection line $5_1$ carries respective uplink and downlink signals US1 and DS1 between the BTS1 and the BSC 30.

The soft hand-off control portion 32 receives at its input a downlink signal DS supplied by the MSC (7 in FIG. 6). The soft hand-off control portion 32 has three outputs connected respectively to the connection lines $5_1$ to $5_3$. The BTS selection generator 34 is connected to the hopping control portion 32a.

Operation of the components of the BSC 30 shown in FIG. 14 is very similar to that of the corresponding components of the BTS 20 shown in FIG. 8. Operations performed by the BSG 34 are the same as those shown in FIG. 9.

Figure 15:
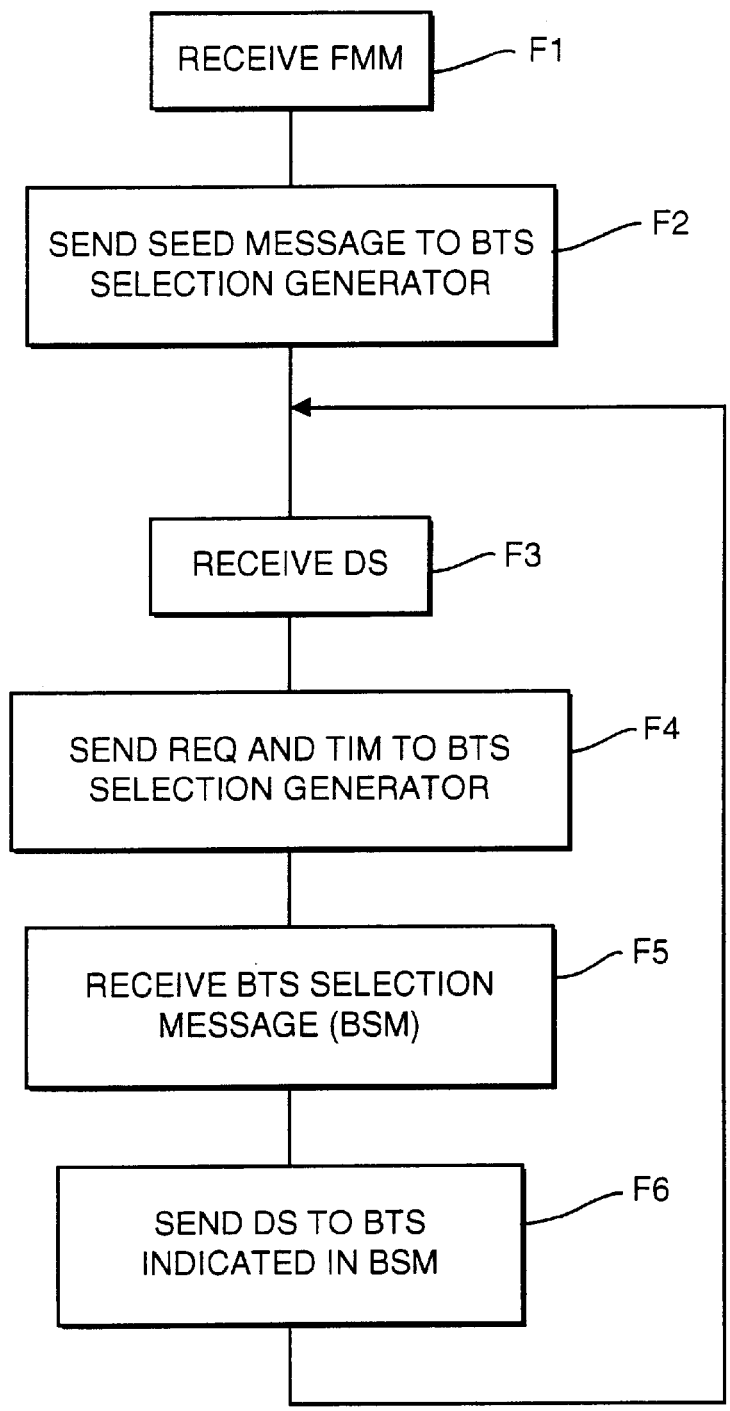
FIG. 15 is a flowchart for illustrating downlink processing in the FIG. 14 base station controller.

Detailed operation of the hopping control portion 32a of the BSC 30 will now be described with reference to the process illustrated in the flow-chart of FIG. 15. The process is initiated in step F1 when a fast mobile message (FMM) is received by the hopping control portion 32a, indicating that BTS hopping mode should be used.

In step F2 a previously-described seed message (SM) is sent to the BTS selection generator (BSG) 34 in order to set the starting conditions of the BSG 34. The SM may be included in the FMM which is communicated to the BSC 30. The process then continues into the BTS hopping mode loop starting in step F3.

In step F3 a downlink signal DS is received by the hopping control portion 32a from the MSC 7. The hopping control portion 32a must now decide to which BTS 20 it is to send this DS (or a signal derived therefrom). To this end, a REQ signal is sent to the BSG 34 in step F4 to request a BTS selection message (BSM), which is received in step F5. In step F4 a value TIM is also sent to the BSG 34 to control and coordinate the timing of the BSG 34.

In step F6 the hopping control portion 32a inspects the received BSM and sends the DS to the BTS 20 which is indicated in the BSM. Processing is then returned to step F3 for the next downlink signal.

When the BSC 30 is operating in BTS hopping mode (i.e. when a fast mobile is detected) as described above for the downlink case, the result is that each downlink signal time slot to be transmitted to the MS 40 is forwarded by the BSC 30 to only one BTS 20, that one BTS 20 having been selected at random for each time slot. In this way, downlink backhaul in the fixed network 5 is reduced. In addition, network interference may also be reduced since only one BTS 20 is transmitting downlink signals to the MS 40.

It will be appreciated that a reduction in downlink fixed network backhaul may be achieved by selecting, rather than just one BTS 20 as described above, any number of BTSs (less than the total number involved in the soft hand-off) to which to transmit the DS. Therefore the BTS selection message (BSM) could indicate more than one BTS 20 which is to receive the DS, or could even indicate one BTS 20 which is not to receive the DS.

As for the uplink case, it will also be appreciated that, rather than selecting BTSs 20 on a random basis, some other method could be used. For example, the BSG 34 could cycle through a list of BTSs in order.

Embodiments of the present invention have been described above separately for uplink and downlink signal processing during a soft hand-off operation, so that the selection of BTSs 20 for uplink backhauling is made independently of the corresponding selection for downlink backhauling. It will be appreciated that the BTS selection made for uplink processing may be used to determine the BTS selection for downlink processing, and vice-versa For example, the BSC 30 could send downlink signals only to those BTSs 20 from which an uplink signal was last received. In this way, one uplink BTS selection is used as the subsequent downlink BTS selection, thereby removing the need for a BSG 34 in the BSC 30. In a similar way, each BTS 20 could decide to send uplink signals to the BSC 30 only if it received a downlink signal therefrom previously. In this way, the BSG 34 in the BSC 30 determines both uplink and downlink BTS selections, removing the need for a BSG in either the MS 40 or BTS 20.

It will be appreciated that it is advantageous, but not essential, to use the BTS hopping operation during soft hand-off when an MS 40 is fast-moving and the soft hand-off method described in co-pending application no. 9810424.3 when the MS 40 is slow-moving.

Although the present invention has been described above in relation to the proposed European wideband CDMA system (UTRA) it will be appreciated that it can also be applied to a system otherwise in accordance with the IS95 standard. It would also be possible to apply the invention in other cellular networks not using CDMA, for example networks using one or more of the following: multiple-access techniques: time-division multiple access (TDMA), wavelength-division multiple access (WDMA), frequency-division multiple access (FDMA) and space-division multiple access (SDMA).

What is claimed is:

1. A cellular mobile communications network comprising:
   a mobile station;
   a plurality of base transceiver stations, each for receiving uplink signals from the mobile station; and
   a base station controller connected to said base transceiver stations for receiving therefrom such uplink signals;
   wherein the network further comprises a base transceiver station selection portion operable, during a hand-off operation involving more than one of said base transceiver stations of the network, to select a subset of those base transceiver stations involved in the hand-off operation, said subset being those base transceiver stations which are to forward a received uplink signal to the base station controller;
   at least one of said base transceiver stations involved in the hand-off operation comprises a hand-off control portion operable, when that station is involved in such a hand-off operation, to determine, based on said subset of base transceiver stations, whether or not to forward to said base station controller such an uplink signal received from the mobile station; and
   wherein the base transceiver station selection portion selects said subset of base transceiver stations using an algorithm, said algorithm is based on a history of signals received by elements of the network operating in a hand-off mode.

2. A cellular mobile communications network comprising:
   a mobile station;
   a plurality of base transceiver stations, each for receiving uplink signals from the mobile station; and
   a base station controller connected to said base transceiver stations for receiving therefrom such uplink signals;
   wherein the network further comprises a base transceiver station selection portion operable, during a hand-off operation involving more than one of said base transceiver stations of the network, to select a subset of those base transceiver stations involved in the hand-off operation, said subset being those base transceiver stations which are to forward a received uplink signal to the base station controller;
   at least one of said base transceiver stations involved in the hand-off operation comprises a hand-off control portion operable, when that station is involved in such a hand-off operation, to determine, based on said subset of base transceiver stations, whether or not to forward to said base station controller such an uplink signal received from the mobile station; and
   wherein the base transceiver station selection portion selects said subset of base transceiver stations using an algorithm, said algorithm is based on the receipt of downlink signals by the base-transceiver station.

3. A cellular mobile communications network comprising:
   a mobile station;
   a plurality of base transceiver stations, each for receiving uplink signals from the mobile station; and
   a base station controller connected to said base transceiver stations for receiving therefrom such uplink signals;
   wherein the network further comprises a base transceiver station selection portion operable, during a hand-off operation involving more than one of said base transceiver stations of the network, to select a subset of those base transceiver stations involved in the hand-off operation, said subset being those base transceiver stations which are to forward a received uplink signal to the base station controller;
   at least one of said base transceiver stations involved in the hand-off operation comprises a hand-off control portion operable, when that station is involved in such a hand-off operation, to determine, based on said subset of base transceiver stations, whether or not to forward to said base station controller such an uplink signal received from the mobile station; and
   wherein the base transceiver station selection portion selects said subset of base transceiver stations using algorithm, said algorithm is based on a pseudo-random algorithm which selects a random subset of base transceiver stations.

4. A cellular mobile communications network comprising:
   a mobile station;
   a plurality of base transceiver stations, each for receiving uplink signals from the mobile station; and
   a base station controller connected to said base transceiver stations for receiving therefrom such uplink signals;
   wherein the network further comprises a base transceiver station selection portion operable, during a hand-off operation involving more than one of said base transceiver stations of the network, to select a subset of those base transceiver stations involved in the hand-off operation, said subset being those base transceiver stations which are to forward a received uplink signal to the base station controller;
   at least one of said base transceiver stations involved in the hand-off operation comprises a hand-off control portion operable, when that station is involved in such a hand-off operation, to determine, based on said subset of base transceiver stations, whether or not to forward to said base station controller such an uplink signal received from the mobile station; and
   wherein the base transceiver station selection portion selects said subset of base transceiver stations using algorithm, said algorithm systematically cycles through subsets of base transceiver stations involved in the hand-off.

5. A cellular mobile communications network comprising:
a mobile station;
a plurality of base transceiver stations, each for receiving uplink signals from the mobile station; and
a base station controller connected to said base transceiver stations for receiving therefrom such uplink signals;
wherein the network further comprises a base transceiver station selection portion operable, during a hand-off operation involving more than one of said base transceiver stations of the network, to select a subset of those base transceiver stations involved in the hand-off operation, said subset being those base transceiver stations which are to forward a received uplink signal to the base station controller;
at least one of said base transceiver stations involved in the hand-off operation comprises a hand-off control portion operable, when that station is involved in such a hand-off operation, to determine, based on said subset of base transceiver stations, whether or not to forward to said base station controller such an uplink signal received from the mobile station; and
said network further comprising a portion which determines whether the time variation of a signal measure calculated from a downlink signal received by the mobile station from the base transceiver stations involved in the hand-off operation is higher than a predetermined threshold,
wherein said signal measure is a time-averaged absolute difference between the expected and received downlink signal strength.

6. A cellular mobile communications network comprising:
a mobile station;
a plurality of base transceiver stations, each for transmitting downlink signals to said mobile station; and
a base station controller connected to said base transceiver stations for applying thereto such downlink signals;
wherein said base station controller further comprises:
a base transceiver station selection portion operable, during a hand-off operation involving more than one of said base transceiver stations of the network, to select a subset of those base transceiver stations involved in the hand-off operation, said subset being those base transceiver stations which are to transmit said downlink signal to the mobile station; and
a hand-off control portion operable, during such a hand-off operation, to supply the downlink signal only to said subset of base transceiver stations,
wherein the base transceiver station selection portion selects said subset of base transceiver stations using an algorithm, said algorithm is based on a history of signals received by elements of the network operating in a hand-off mode.

7. A cellular mobile communications network comprising:
a mobile station;
a plurality of base transceiver stations, each for transmitting downlink signals to said mobile station; and
a base station controller connected to said base transceiver stations for applying thereto such downlink signals;
wherein said base station controller further comprises:
a base transceiver station selection portion operable, during a hand-off operation involving more than one of said base transceiver stations of the network, to select a subset of those base transceiver stations involved in the hand-off operation, said subset being those base transceiver stations which are to transmit said downlink signal to the mobile station; and
a hand-off control portion operable, during such a hand-off operation, to supply the downlink signal only to said subset of base transceiver stations,
wherein the base transceiver station selection portion selects said subset of base transceiver stations using algorithm, said algorithm is based on the receipt of uplink signals by the base station controller.

8. A cellular mobile communications network comprising:
a mobile station;
a plurality of base transceiver stations, each for transmitting downlink signals to said mobile station; and
a base station controller connected to said base transceiver stations for applying thereto such downlink signals;
wherein said base station controller further comprises:
a base transceiver station selection portion operable, during a hand-off operation involving more than one of said base transceiver stations of the network, to select a subset of those base transceiver stations involved in the hand-off operation, said subset being those base transceiver stations which are to transmit said downlink signal to the mobile station; and
a hand-off control portion operable, during such a hand-off operation, to supply the downlink signal only to said subset of base transceiver stations,
wherein the base transceiver station selection portion selects said subset of base transceiver stations using an algorithm, said algorithm is based on a pseudo-random algorithm which selects a random subset of base transceiver stations.

9. A cellular mobile communications network comprising:
a mobile station;
a plurality of base transceiver stations, each for transmitting downlink signals to said mobile station; and
a base station controller connected to said base transceiver stations for applying thereto such downlink signals;
wherein said base station controller further comprises:
a base transceiver station selection portion operable, during a hand-off operation involving more than one of said base transceiver stations of the network, to select a subset of those base transceiver stations involved in the hand-off operation, said subset being those base transceiver stations which are to transmit said downlink signal to the mobile station; and
a hand-off control portion operable, during such a hand-off operation, to supply the downlink signal only to said subset of base transceiver stations,
wherein the base transceiver station selection portion selects said subset of base transceiver stations using algorithm, said algorithm systematically cycles through subsets of base transceiver stations involved in the hand-off.

10. A cellular mobile communications network comprising:
a mobile station;
a plurality of base transceiver stations, each for transmitting downlink signals to said mobile station; and
a base station controller connected to said base transceiver stations for applying thereto such downlink signals;
wherein said base station controller further comprises:
a base transceiver station selection portion operable, during a hand-off operation involving more than one of said base transceiver stations of the network, to select a subset of those base transceiver stations involved in the hand-off operation, said subset being those base transceiver stations which are to transmit said downlink signal to the mobile station; and
a hand-off control portion operable, during such a hand-off operation, to supply the downlink signal only to said subset of base transceiver stations,
said network further comprising a portion which determines whether the time variation of a signal measure calculated from a downlink signal received by the mobile station from the base transceiver stations involved in the hand-off operation is higher than a predetermined threshold, wherein the signal measure is a time-averaged absolute difference between the expected and received downlink signal strength.

* * * * *